US008418345B2

(12) United States Patent
Potthast et al.

(10) Patent No.: US 8,418,345 B2
(45) Date of Patent: Apr. 16, 2013

(54) METHOD FOR PRODUCING A HOLLOW PROFILE JOINT AND A HOLLOW PROFILE

(75) Inventors: Simon Potthast, Paderborn (DE); Siegfried Fecke, Scharmede (DE); Michael Wibbeke, Paderborn (DE); Jürgen Krogmeier, Hövelhof (DE); Armin Zuber, Bad Lippspringe (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 252 days.

(21) Appl. No.: 12/938,751

(22) Filed: Nov. 3, 2010

(65) Prior Publication Data
US 2011/0274484 A1 Nov. 10, 2011

(30) Foreign Application Priority Data

Nov. 4, 2009 (DE) .......................... 10 2009 051 951

(51) Int. Cl.
*B21B 1/46* (2006.01)
*F16B 11/00* (2006.01)
(52) U.S. Cl.
USPC .......................................... 29/527.1; 403/270
(58) Field of Classification Search ................. 29/527.1, 29/527.2, 527.4, 525.14, 428, 505, 506, 508, 29/512, 461, 450, 451, 453; 228/135, 168, 228/246; 403/270
See application file for complete search history.

(56) References Cited

U.S. PATENT DOCUMENTS

| 2,769,318 | A | * | 11/1956 | Grenell | .......................... 62/511 |
|---|---|---|---|---|---|
| 7,357,461 | B2 | | 4/2008 | Zuber | |
| 7,556,273 | B2 | | 7/2009 | Streubel et al. | |
| 2003/0084917 | A1 | | 5/2003 | Pape et al. | |
| 2006/0273530 | A1 | | 12/2006 | Zuber | |
| 2007/0193841 | A1 | | 8/2007 | Zuber | |
| 2008/0110223 | A1 | | 5/2008 | Zuber | |
| 2008/0265626 | A1 | | 10/2008 | Dorr et al. | |
| 2009/0236163 | A1 | | 9/2009 | Wibbeke et al. | |

FOREIGN PATENT DOCUMENTS

DE 102007060116 6/2009

* cited by examiner

*Primary Examiner* — John C Hong
(74) *Attorney, Agent, or Firm* — Henry M Feiereisen LLC

(57) ABSTRACT

In a method for producing a joint between a hollow profile made from steel and a component made from an aluminum material, a positive and material joint is produced by a braze welding process in conjunction with a pressing operation. The hollow profile is first pressed on a seating region of the component. Subsequently, a weld layer with an additive is applied by thermal joining, producing a positive and material joint between the hollow profile and the component. The positive joint is facilitated by first forming an end of the hollow profile to be pressed on. Preferably, forming is done by widening the end to be pressed on into the shape of a collar.

23 Claims, 5 Drawing Sheets

METHOD FOR PRODUCING A HOLLOW PROFILE JOINT AND A HOLLOW PROFILE

CROSS-REFERENCES TO RELATED APPLICATIONS

This application claims the priority of German Patent Application, Serial No. 10 2009 051 951.3-24, filed Nov. 4, 2009, pursuant to 35 U.S.C. 119(a)-(d), the content of which is incorporated herein by reference in its entirety as if fully set forth herein.

BACKGROUND OF THE INVENTION

The present invention relates to a method for producing a joint between a hollow profile made from steel and a component made from an aluminum material. The present invention also relates to a hollow profile joint of a hollow profile made from steel with a component made from an aluminum material.

The following discussion of related art is provided to assist the reader in understanding the advantages of the invention, and is not to be construed as an admission that this related art is prior art to this invention.

In the context of the present specification and claims, the term "positive fit" or "positively" is meant to indicate a form-fitting or interlocking engagement between components, and the term "non-positive fit" or "non-positively" is meant to indicate a force-fitting engagement or an interference fit between components.

Frequently, non-thermal joining methods employing, for example, rivets or screws are used for joining components made from steel and an aluminum material. The different components are here joined by a positive lock produced by the rivet and the screw, respectively. However, the strength of such joint is limited due to the point-wise force transfer.

The realization of steel-aluminum hybrid components has great potential for weight reduction and improvement of the product properties, in particular of the vehicle body. The aforedescribed cold joining methods, for example riveting or adhesive techniques, do not lead to the required stability.

Conventional joint-welding methods are known which make it possible to realize a material weld in spite of the different melting points of the two alloys, steel and aluminum. These methods are known in the state-of-the-art as braze welding processes. Only the material constituent of the aluminum component is melted, and the component made from steel is materially connected with the aluminum material by a brazing process. When using a brazing process, the steel component is coated before the braze welding process. Such coating can be implemented, for example, by galvanizing. The galvanized steel component is wetted by the welding deposit and the intermetallic phases can be reduced to a small amount. However, these material joints also have only limited strength.

Also disadvantageous is the existence of a gap between the cast aluminum part and the steel pipe. Ambient air may enter the melt through this gap during the welding process, resulting in a weld of poor quality and hence low strength. Moreover, moisture can reach the steel-aluminum transition during the operation, causing additional gap corrosion.

It would therefore be desirable and advantageous to address this problem and to obviate other prior art shortcomings by providing a method for producing a joint between two components with different material properties, which has exceptionally high strength and a long service life. It would also be desirable to provide a corresponding hollow profile joint.

SUMMARY OF THE INVENTION

According to one aspect of the present invention, a method for producing a joint between a hollow profile from steel and a component from an aluminum material includes the steps of applying a coating on the hollow profile, pressing the hollow profile on the component, and thermally joining the hollow profile and the component.

According to one aspect of the present invention, a hollow profile joint is produced by materially and non-positively joining a hollow profile made from steel with a component made from an aluminum material, pressing the hollow profile on the component and additionally thermally joining the hollow profile with the component. The joint may be additionally enhanced, depending on the prevailing geometry, by a positive fit.

Advantageously, a joint formed in this manner produces a non-positive joint by pressing a coated steel pipe in the longitudinal direction in combination with a material joint, which is produced by a thermal joining process, for example MIG welding with aluminum additive. The press fit also eliminates the need to hold the various components in place during the thermal joining.

According to another advantageous embodiment of the method, thermal joining and production of a material joint between the component and the hollow profile is improved by a positive joint. The positive joint is produced by the supplied welding deposit and the hollow profile. The strength of the produced material and non-positive joints is further increased by a positive fit.

Advantageously, the aluminum component is constructed as a cast body or a milled body, with the component being machined by metal-cutting before being pressed on a seating region of the hollow profile. In this way, a precise fit of the hollow profile to be pressed on the component can be realized. In addition, manufacturing tolerances can thereby be minimized.

Advantageously, the component has an expanding mandrel on which the hollow profile is pressed. The thus produced press fit between the expanding mandrel and the hollow profile establishes a non-positive joint between the two components. This non-positive joint enhances the positive and material joint between the components, thereby further increasing the strength of the joint.

Advantageously, the expanding mandrel has a bevel on its free end and has a length over which the hollow profile is pressed on the expanding mandrel. The angle may be between 20° and 60°. The length should preferably be between 8 and 60 mm. The bevel facilitates joining of the two components by centering the hollow profile at the beginning of the pressing operation, so that the hollow profile can be easily pressed over the expanding mandrel in the starting region. The strength of the non-positive joint can be readily affected by selecting the length and shape of the expanding mandrel, with a long expanding mandrel producing a strong non-positive joint. Conversely, a shorter expanding mandrel produces a non-positive joint of lesser strength. The bevel may also be formed by a radius or have a funnel-like shape or a tulip-like shape.

According to an advantageous embodiment of the present invention, the component has a trough-shaped recess encircling the expanding mandrel and adapted to receive a formed region of the hollow profile, wherein the recess has a partial region with a curvature having a radius on both sides. The radius is preferably between 1 mm and 18 mm. With the trough shaped recess in combination with a formed region of the hollow profile, the two components can be joined both positively and materially by welding. The trough-shape recess is provided to receive the welding deposit on the exterior side and to receive the formed region of the hollow profile on the interior side, in relation to the expanding mandrel. The welding deposit which is joined materially with the component on the exterior side thereby forms an undercut for the formed region of the hollow profile. This produces the positive joint with particularly high strength under static and dynamic tension, bending and torsion loads.

Advantageously, the trough-shaped recess is delimited on the interior side by the expanding mandrel and on the exterior side by a receiving bead. The receiving bead should have a height of preferably between 3 and 10 mm. The side of the receiving bead facing the expanding mandrel should also extend at an angle relative to the longitudinal axis of the expanding mandrel. This angle should preferably be between 20° and 60°. The aforedescribed properties for the receiving bead produce in thermal joining process optimal properties for receiving the welding deposit and the welding additive.

Advantageously, the hollow profile is formed and/or calibrated before being pressed onto an end. In the forming process, the end to be pressed is preferably expanded into a collar. The hollow profile may have different cross sections in the joint region, but may particularly be circular. However, non-circular and elliptical cross sections as well as cross sections with corners are also possible. The forming process should be adapted to the respective type of profile. With the used type of profile, the hollow profile is calibrated and oriented on the component in that the inside contour in conjunction with the expanding mandrel align the hollow profile relative to the component. According to the invention, the hollow profile and the expanding mandrel may also have a rectangular or polygonal shape.

Advantageously, during forming of the hollow profile, a radius is formed on the inside on the end of the hollow profile to be pressed on which is equal to the interior radius of the trough-shaped indentation. The press fit between the hollow profile and the component then no longer has a gap between the component and the hollow profile in the end region. This prevents ambient air from entering the melt during thermal joining, which would result in poor welds. Moisture from the ambient air is also prevented from entering the press fit, thereby eliminating gap corrosion at a later time. Both advantageous features increase the strength and durability of the produced joint. In one embodiment according to the invention, the hollow profile is upset on the expanding mandrel. Upsetting also eliminates mechanical post-processing of the ends of the hollow profile.

According to another advantageous embodiment, the outside of the hollow profile is deburred on the formed end. Advantageously, the deburred end minimizes a gap produced between the hollow profile and the component during thermal joining. This also increases the strength and durability of the produced joint.

Advantageously, the hollow profile is coated by galvanizing or spray coating. Galvanizing is implemented either as low-temperature galvanizing or as high-temperature galvanizing, whereas spray coating preferably includes aluminum or zinc spray coating. Due to the coating, the joint of the component made from aluminum with the coated hollow profile is a material joint produced by braze welding. As a general rule, tin coating would also be feasible.

Advantageously, an additive is used during thermal joining, which in a particularly preferred embodiment is made from an aluminum alloy. The employed additive is joined by the thermal joining process, welding, with the interior side of the receiving bead, thus forming a strong material joint. On the side of the hollow profile, the additive is joined with the coating of the hollow profile by thermal joining, braze welding. A material joint is therefore also formed on this side.

Advantageously, thermal joining is performed in an inert gas, which allows a particularly good control of the joining process. The inert gas is typically argon, wherein depending on the component, addition of helium, up to a mass fraction of 50%, can improve the welding outcome.

In another advantageous embodiment, thermal joining may be performed with a single layer or with several layers. Implementation of a multilayer joining process can intentionally target the required properties of the joint. Advantages are increased strength and a reduced thermal effect in the welding zone. In a multilayer welding process, a large quantity of welding deposit need not be materially connected in a single operation. The additive can be applied in several layers.

Advantageously, during the thermal joining, the weld seam may be mechanically and/or chemically cleaned between the depositions of individual layers. Such cleaning may be performed, for example, with dry ice blasting. The cleaned weld seam produces an improved joint and an improved welding result for the weld seam to be applied later, as compared to an untreated weld seam.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 4 shows a schematic cross-section of the hollow profile to be pressed on.

DETAILED DESCRIPTION OF PREFERRED EMBODIMENTS

Figure 1:
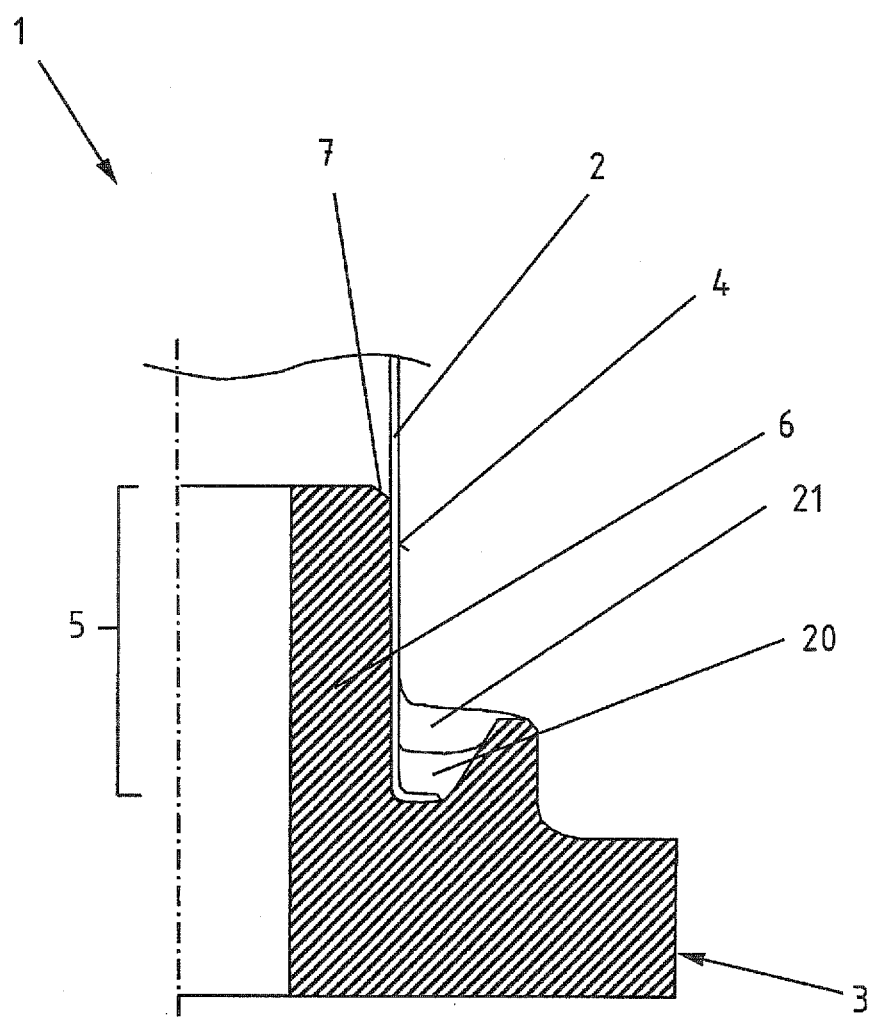
FIG. 1 shows a schematic cross-section of a joint produced according to the invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a joint 1 according to the invention between a hollow profile 2 and a component 3. The hollow profile 2 is constructed from steel, whereas the component 3 is constructed from aluminum, preferably as a cast aluminum body. A coating 4 is applied to the hollow profile 2 at least in a seating region 5. The aluminum component 3 has in the seating region 5 an expanding mandrel 6. When the hollow profile 2 is pressed on the component 3, a non-positive joint between the hollow profile 2 and the component 3 is produced in the seating region 5. The non-positive joint is produced by an oversize of the component 3 relative to the coated hollow profile 2. For pressing the hollow profile 2 on the component 3, the upper, free end of the expanding mandrel 6 has a bevel 7.

Figure 2:
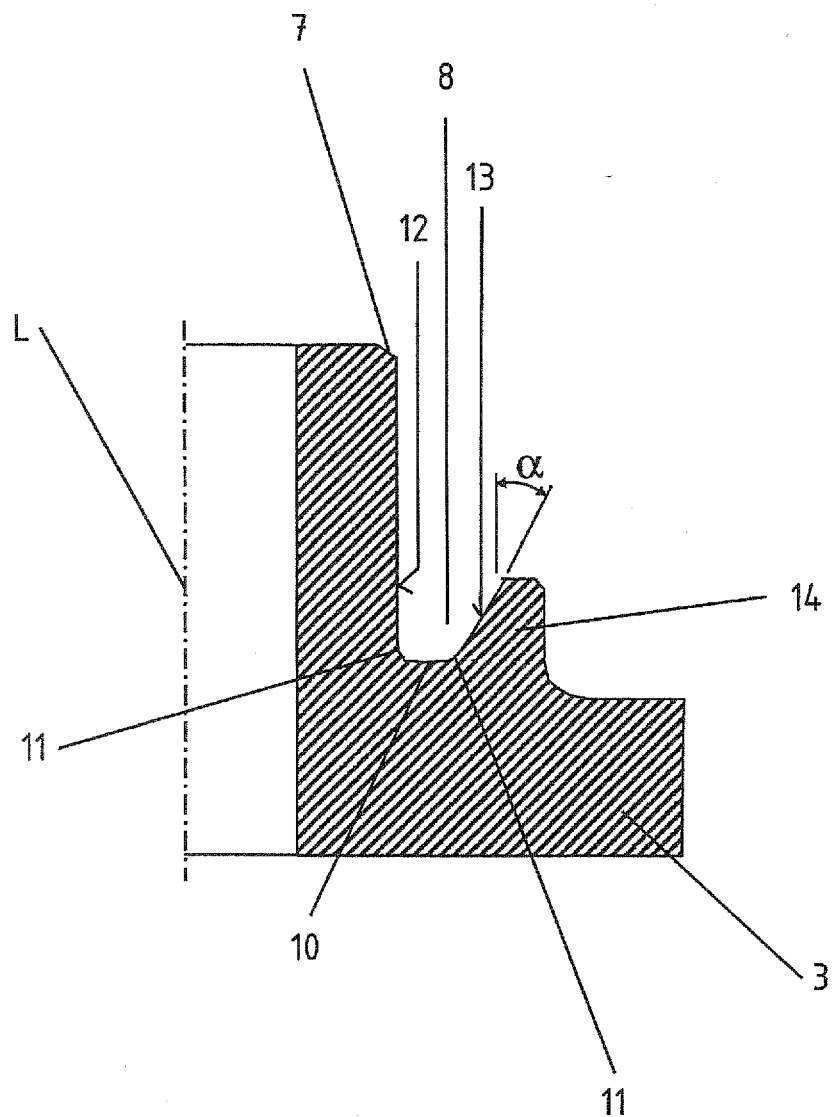
FIG. 2 shows a schematic cross-section of the seating region of the component.

FIG. 2 shows an exemplary cross-section through a component 3 without a pressed-on hollow profile 2. The lower end of the expanding mandrel 6 of the component 3 has a recess 8. A formed region 9 of the hollow profile 2 engages in this recess 8. The recess 8 has a valley region 10. The valley region 10 has on both sides a curvature 11 which transitions at the expanding mandrel 6 into an interior side 12 and into an exterior side 13. The component 3 has on the exterior side 13 a receiving bead 14 adapted to receive the welding deposit during the thermal joining process. The exterior side 13 extends at an angle α with respect to a longitudinal axis L of the expanding mandrel 6. To advantageously apply a welding deposit with a welding torch and to increase the contact surface area between the receiving bead 14 and the welding deposit, the angle α has preferably a value in a range between 10° and 75°.

Figure 3:
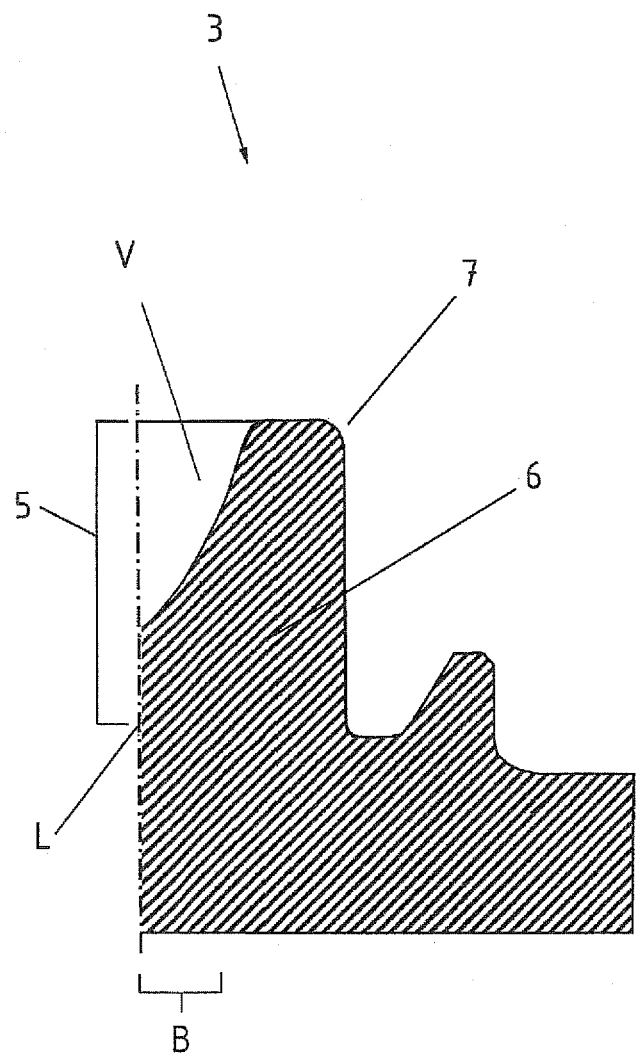
FIG. 3 shows a different embodiment of a schematic cross-section of the seating region of a component.

FIG. 3 shows a cross-sectional view of a different embodiment of a component 3. The bevel 7 has here a curvature with a radius. In addition, the region B of the component 3 facing the central longitudinal axis L is constructed in solid form and slopes downward in the seating region 5 from the bevel 7 towards the longitudinal axis L, forming a recess V. The stress characteristic is optimized by upsetting an end of the pipe onto the expanding mandrel 6 in conjunction with the recess V.

Figure 4:
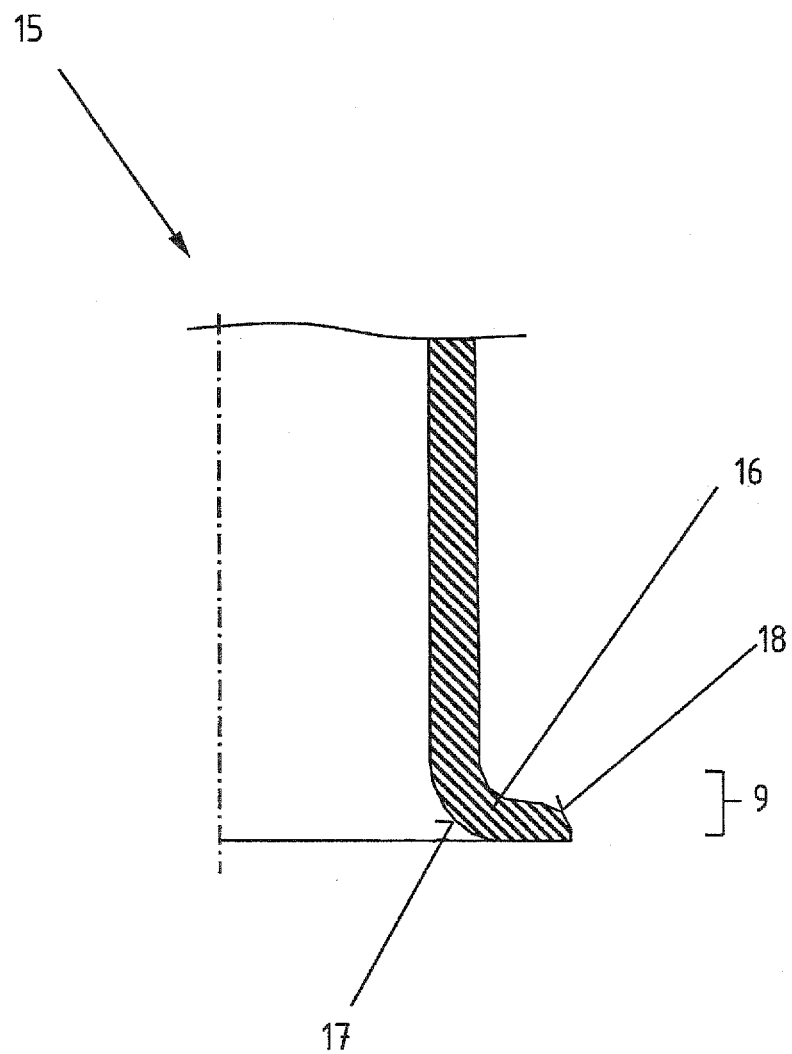

FIG. 4 shows a cross-section of an end 15 of a hollow profile 2 to be pressed on. The hollow profile 2 is here shaped into a collar 16 by widening the end 15 to be pressed on. On the inside of the hollow profile 2, the region 9 shaped into the collar 16 has an interior collar side 17 with a radius that is identical to the radius on the interior side 12 of the recess 8. The hollow profile 2 is deburred on an outside 18 of the collar 16.

Figure 5:
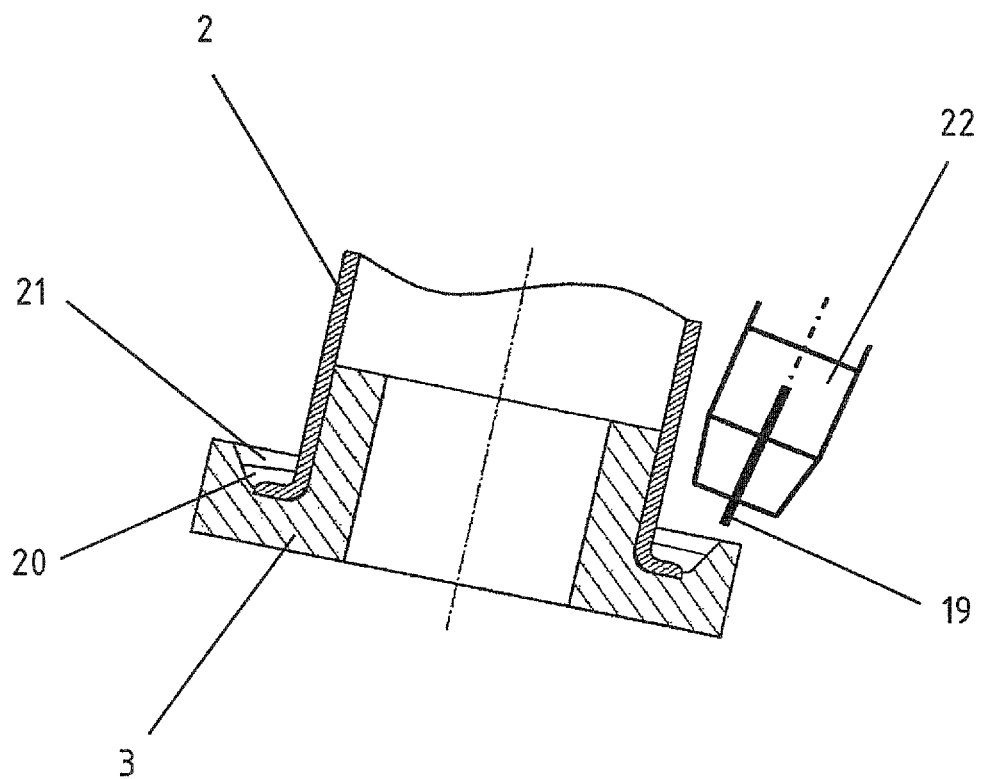
FIG. 5 shows a schematic diagram of a thermal joining process.

FIG. 5 schematically illustrates a thermal joining process. The hollow profile 2 is here pressed onto the component 3 and is positively and materially joined with the component 3 in the recess 8 by weld layers with an additive 19. In this exemplary embodiment, the thermal joining process is implemented with two layers, with the first layer 20 and the second layer 21 being shown. The layers 20, 21 are applied with a welding torch 22, in this example in a MIG welding process.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for producing a joint between a hollow profile made from steel and a component made from an aluminum material, the method comprising the steps of:
   applying a coating on the hollow profile,
   pressing the hollow profile on the component in a longitudinal direction of the hollow profile so as to produce a non-positive joint between the hollow profile and the component, and
   thermally joining the hollow profile and the component.

2. The method of 1, wherein the thermal joining produces a positive and a material joint between the component and the hollow profile.

3. The method of claim 1, wherein the component is formed as a cast aluminum body or a milled body and wherein the component is machined by metal-cutting before the hollow profile is pressed on the component in a seating region.

4. The method of claim 1, wherein the component has a mandrel and that the hollow profile is pressed on the mandrel, producing a non-positive joint between the mandrel and the hollow profile.

5. The method of claim 4, wherein a free end of the mandrel has a bevel.

6. The method of claim 4, wherein the bevel has an angle between about 20° and about 60°.

7. The method of claim 4, wherein the mandrel has a seating region with a length between about 8 mm and about 60 mm.

8. The method of claim 4, wherein the component has a trough-shaped recess encircling the mandrel for receiving a formed region of the hollow profile, and wherein the trough-shaped recess forms a valley region with a curvature on two sides.

9. The method of claim 8, wherein the radius is between about 1 mm and about 18 mm.

10. The method of claim 8, wherein the trough-shaped recess is formed on an interior side by the mandrel and on an exterior side by a receiving bead.

11. The method of claim 10, wherein the receiving bead has a height between about 3 mm and about 10 mm.

12. The method of claim 10, wherein a side of the receiving bead facing the mandrel extends at an angle relative to a longitudinal axis of the mandrel.

13. The method of claim 10, wherein the angle is between about 20° and about 60°.

14. The method of claim 1, wherein before the hollow profile is pressed on the component, an end of the hollow profile to be pressed on is formed or calibrated.

15. The method of claim 14, wherein the hollow profile is formed or calibrated by expanding the end to be pressed on into a collar.

16. The method of claim 8, wherein by forming or calibrating, a radius is produced inside an end of the hollow profile to be pressed on, with the radius being identical to a radius an interior side of the valley region.

17. The method of claim 14, wherein an outside of the end of the formed or calibrated hollow profile is deburred.

18. The method of claim 1, wherein the hollow profile is coated by galvanizing or aluminum spray coating.

19. The method of claim 18, wherein the coating has a thickness between 7 μm and 100 μm.

20. The method of claim 1, wherein an additive made from an aluminum alloy is employed during thermal joining.

21. The method of claim 1, wherein thermal joining comprises deposition of a plurality of individual layers, wherein between depositions of the individual layers, a deposited individual layer is mechanically or chemically cleaned.

22. A hollow profile joint comprising:
   a hollow profile made from steel and having a coating,
   a component made from an aluminum material and having a mandrel,
   wherein the hollow profile is pressed on the component in a longitudinal direction of the hollow profile so as to produce a non-positive joint between the hollow profile and the component, and wherein the hollow profile is additionally thermally joined with the component.

23. The hollow profile joint of claim 22, wherein the mandrel has a bevel disposed on a free end and a valley-shaped recess which extends in a seating region from the bevel to a longitudinal axis of the component.

* * * * *